(12) United States Patent
Muser

(10) Patent No.: US 7,853,927 B2
(45) Date of Patent: Dec. 14, 2010

(54) METHODS AND TOOLS FOR EXECUTING AND TRACING USER-SPECIFIED KERNEL INSTRUCTIONS

(75) Inventor: Carol Petersen Muser, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1489 days.

(21) Appl. No.: 11/051,750

(22) Filed: Feb. 3, 2005

(65) Prior Publication Data
US 2006/0174229 A1     Aug. 3, 2006

(51) Int. Cl.
G06F 9/44     (2006.01)
(52) U.S. Cl. .................. 717/128; 717/126; 717/127; 717/130
(58) Field of Classification Search ................ 717/128, 717/130
See application file for complete search history.

(56) References Cited

U.S. PATENT DOCUMENTS

| | | | |
|---|---|---|---|
| 5,459,867 A | | 10/1995 | Adams |
| 5,634,058 A | * | 5/1997 | Allen et al. .................. 717/163 |
| 5,812,848 A | | 9/1998 | Cohen |
| 6,226,725 B1 | | 5/2001 | Yarborough |
| 6,950,962 B2 | | 9/2005 | Mathias |
| 7,099,866 B1 | * | 8/2006 | Crosbie et al. .................. 707/9 |
| 7,143,281 B2 | * | 11/2006 | Chandramouleeswaran et al. .................. 713/100 |
| 7,313,734 B2 | * | 12/2007 | DeWitt et al. .................. 714/45 |
| 7,395,528 B1 | * | 7/2008 | Cantrill .................. 717/128 |
| 2002/0023211 A1 | * | 2/2002 | Roth et al. .................. 713/164 |
| 2003/0046606 A1 | | 3/2003 | Johnson |
| 2003/0074604 A1 | * | 4/2003 | Mathias et al. .................. 714/38 |
| 2004/0237070 A1 | | 11/2004 | Roth |
| 2005/0071856 A1 | * | 3/2005 | Kumar et al. .................. 719/330 |

OTHER PUBLICATIONS

Vevea, M., "Function Prototypes", www.nmr.mgh.harvard.edu/C/prototypes.shtml (date unknown) (2 pages).
Summit, S. "Function Prototypes", www.eskimo.com/~scs/cclass/notes.sx5b.html, 1995-1996 (2 pages).
"Function Prototypes", www.taumoda.com/web/class/day7.html (date unknown) (3 pages).
Obanos, "Functions prototypes", www.codeproject.com/purgatory/blackozemia.asp (Mar. 2003) 1 page.
Hewlett Packard, "Developing Dynamically Loadable Kernel Modules Issue 1.0 HP-UX 11.0" Oct. 12, 1998 (70 pages).
U.S. Appl. No. 09/976,727, Office Action dated Jul. 22, 2004, pp. 1-7 with attachments.
U.S. Appl. No. 09/976,727, Office Action dated Feb. 1, 2005, pp. 1-10.
U.S. Appl. No. 09/976,727, Notice of Allowance dated May 4, 2005, pp. 1-3.

* cited by examiner

*Primary Examiner*—Tuan Q Dam
*Assistant Examiner*—Isaac T Tecklu (57) ABSTRACT

Embodiments of the present invention present methods of tracing kernel functions of a kernel including: building a kernel tracing dynamically loadable kernel module (DLKM) wherein the kernel tracing DLKM contains user-specified kernel code; loading the kernel tracing DLKM on a target machine; invoking the kernel tracing DLKM on the target machine; and tracing kernel functions wherein trace variables are gathered. In some embodiments, the method may further include: creating user-specified kernel code wherein at least one kernel activity may be inspected or tested; creating at least one trace point corresponding to a point at which the kernel tracing DLKM is invoked; and compiling the kernel tracing DLKM.

26 Claims, 5 Drawing Sheets

OVERVIEW

FIG. 3

SPECIFY KTRACER_DLKM
(STEP 304)

METHODS AND TOOLS FOR EXECUTING AND TRACING USER-SPECIFIED KERNEL INSTRUCTIONS

BACKGROUND OF THE INVENTION

A kernel is the central module of an operating system. It is the part of the operating system that typically loads first, and remains in main memory during system operation. Because the kernel remains in memory, it is important for the kernel to be as small as possible while still providing all the essential services required by other parts of the operating system and applications. Some of those essential services include, for example, memory management, process and task management, and disk management for example.

Because computing technology continues to evolve, kernels too must evolve in order to meet new technological requirements. In the past, when kernels were reasonably simple and functions limited, a kernel could be easily understood. As such, technological developments could be readily addressed. However, as technology has progressed and users have demanded increased functionality in computing systems, so kernel functions have increased in number and in complexity to meet this demand.

Figure 1:
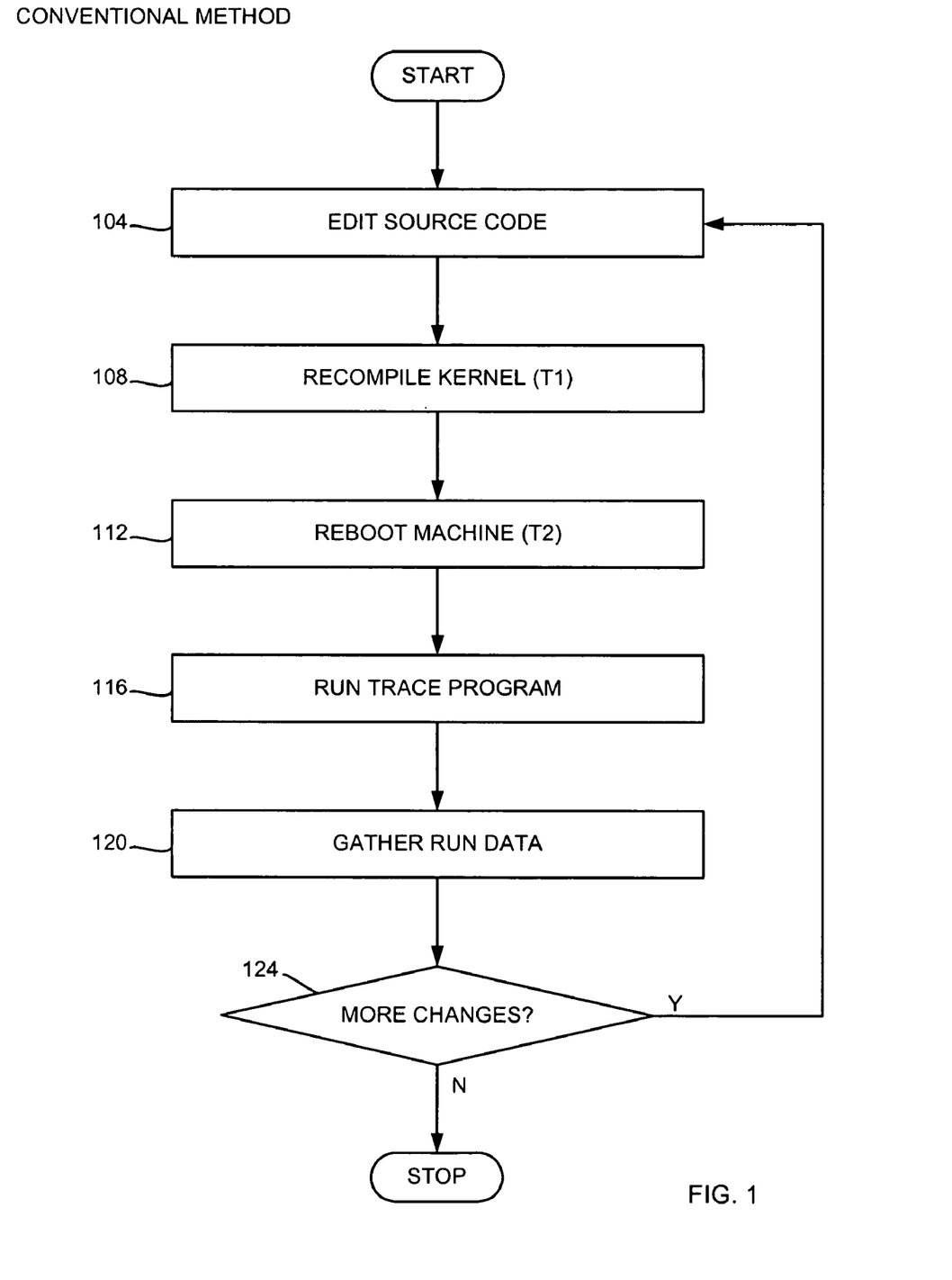
FIG. 1 is diagrammatic flowchart illustrating a conventional method of making and tracing kernel instructions.

Referring to FIG. 1, FIG. 1 is diagrammatic flowchart illustrating a conventional method of making kernel changes. For example, at a first step 104, source code may be edited. In this illustration, source code refers to kernel source code. As can be appreciated, source code may be edited by any number of means well known in the art. Source code may be edited for any of a number of reasons like, for example, adding functionality, deleting extraneous code, or debugging code. Once kernel source code has been edited, kernel source code may be recompiled at a step 108. The time representing a recompile step is indicated as T1. In some examples, recompiling kernel source code might take as long as 4 to 8 hours. It can be appreciated that methods reducing or eliminating recompile time T1 would be desirable.

At a next step 112, a system on which a recompiled kernel is targeted may be rebooted. The time representing a reboot step is indicated as T2. In some examples, a reboot of such a system might require 10 minutes to 5 hours. It may be noted that even for small changes in source code, a recompile step and a reboot step may be required. Thus, even simple changes might require a significant amount of downtime while a system is prepared to run. It can be appreciated that methods reducing or eliminating reboot time T2 would be desirable. For example, in some production environments, reboots may be cost prohibitive as a system outage may result in increased operational overhead, lower revenue, lower production, etc. Once a system has been rebooted, a trace program may be run at a step 116. Run data may then be gathered at a step 120. Run data may include any of a number of variables of interest related to kernel activity. Finally, the method determines whether more changes to kernel source code are desired at a step 124. Changes may be made based on results, for example, gathered from run data step 120.

As can be seen, methods of reducing down time due to recompiling and rebooting may be desirable when making or testing kernel changes, particularly where changes are incremental or numerous. Thus, methods and tools for executing and tracing user-specified kernel instructions.

SUMMARY OF INVENTION

Embodiments of the present invention present methods of tracing kernel functions of a kernel including: building a kernel tracing dynamically loadable kernel module (DLKM) wherein the kernel tracing DLKM contains user-specified kernel code; loading the kernel tracing DLKM on a target machine; invoking the kernel tracing DLKM on the target machine; and tracing kernel functions wherein trace variables are gathered. In some embodiments, the method may further include: creating user-specified kernel code wherein at least one kernel activity may be inspected or tested; creating at least one trace point corresponding to a point at which the kernel tracing DLKM is invoked; and compiling the kernel tracing DLKM. In still other embodiments, the method may further include defining the trace variable wherein the trace variable relates to the at least one kernel activity. In some embodiments, the user-specified kernel code is selected from the group consisting of: a runtime assertion, a function call, a function, an increment counter, and a kernel state modification. In still other embodiments, methods of building a kernel tracing dynamically loadable kernel module (DLKM) include: creating the user-specified kernel code wherein at least one kernel activity may be inspected or tested; creating at least one trace point corresponding to a point at which the kernel tracing DLKM is invoked; and compiling the kernel tracing DLKM.

In other embodiments, a kernel tracing dynamically loadable kernel module (DLKM) is presented including: a user-specified kernel code wherein at least one kernel activity may be inspected or tested; at least one trace point corresponding to a point at which the kernel tracing DLKM is invoked; and a DLKM wrapper. In further embodiments, the kernel tracing DLKM may further include a trace variable wherein the trace variable relates to the at least one kernel activity. In some embodiments, the user specified kernel code is selected from the group consisting of: a runtime assertion, a function call, a function, an increment counter, and a kernel state modification.

In still other embodiments, a computer program product for use in conjunction with a computer system for tracing kernel functions of a kernel is presented including: instructions for building a kernel tracing dynamically loadable kernel module (DLKM) wherein the kernel tracing DLKM contains user-specified kernel code; instructions for loading the kernel tracing DLKM on a target machine; instructions for invoking the kernel tracing DLKM on the target machine; and instructions for tracing kernel functions wherein trace variables are gathered. In other embodiments, instructions for the building the kernel tracing DLKM includes: instructions for creating the user-specified kernel code wherein at least one kernel activity may be inspected or tested; instructions for creating at least one trace point corresponding to a point at which the kernel tracing DLKM is invoked; and instructions for compiling the kernel tracing DLKM. In still other embodiments, the computer program product further includes instructions for defining the trace variable wherein the trace variable relates to the at least one kernel activity. In still other embodiments, the user-specified kernel code is selected from the group consisting of: a runtime assertion, a function call, a function, an increment counter, and a kernel state modification.

In still other embodiments, methods of debugging a kernel are presented including: building a debugging dynamically loadable kernel module (DLKM) wherein the debugging DLKM contains user-specified kernel debugging code; loading the debugging DLKM on a target machine; invoking the debugging DLKM on the target machine; and debugging the kernel wherein a debugging value is gathered. In still other embodiments, the building the debugging DLKM includes: creating user-specified kernel debugging code wherein at least one kernel activity may be inspected or tested; creating at least one trace point corresponding to a point at which the debugging DLKM is invoked; and compiling the debugging DLKM.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 2:
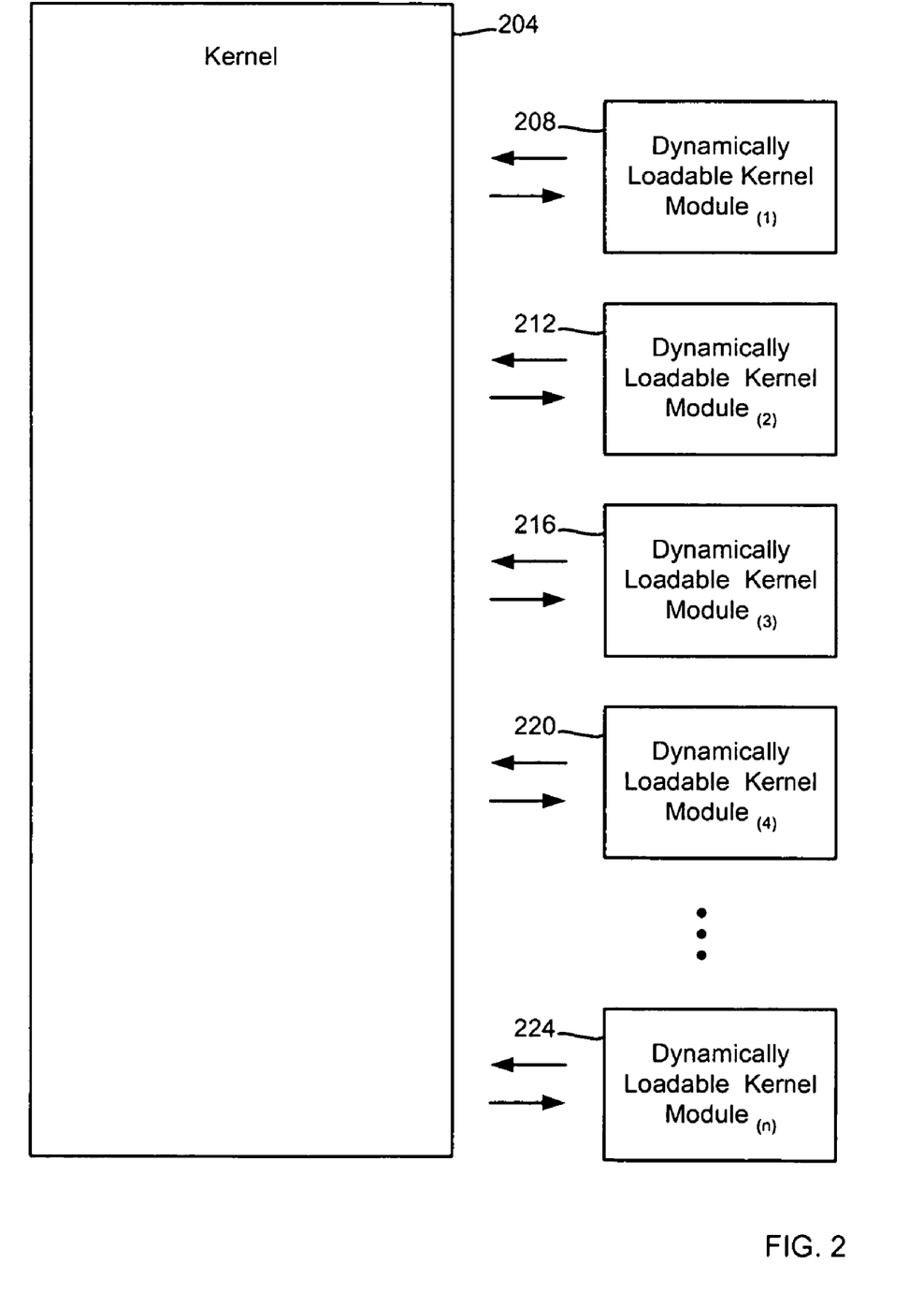
FIG. 2 is diagrammatic representation illustrating a kernel in an embodiment of the present invention.

FIG. 2 is diagrammatic representation illustrating a kernel 204 in an embodiment of the present invention. As noted above, a kernel is the central module of an operating system. The kernel is the part of the operating system that typically loads first, and remains in main memory during system operation. Because a kernel must remain in memory during system operation, then conventional changes to a kernel may require recompile and reboot. In the embodiment illustrated, kernel 204 may be configured with dynamically loadable kernel modules 208-224. Dynamically loadable kernel modules may be analogous to dynamic link library (DLL). A DLL is a library of executable functions or data that can be used by an application. Typically, a DLL provides one or more particular functions that a program may access by creating either a static or dynamic link to the DLL. In analogous fashion, a DLKM may provide functions that a kernel may access during operation. As shown, any number of DLKM's 208-224 may be configured to link to a kernel. By way of example, a strong random number generator; a compact disc file system; an advanced file system; or a network file system server may be configured as DLKM's. As can be appreciated, these and many more DLKM's may be configured in accordance with user preferences. Furthermore, DLKM's may be optionally loaded and unloaded without reboot.

Figure 3:
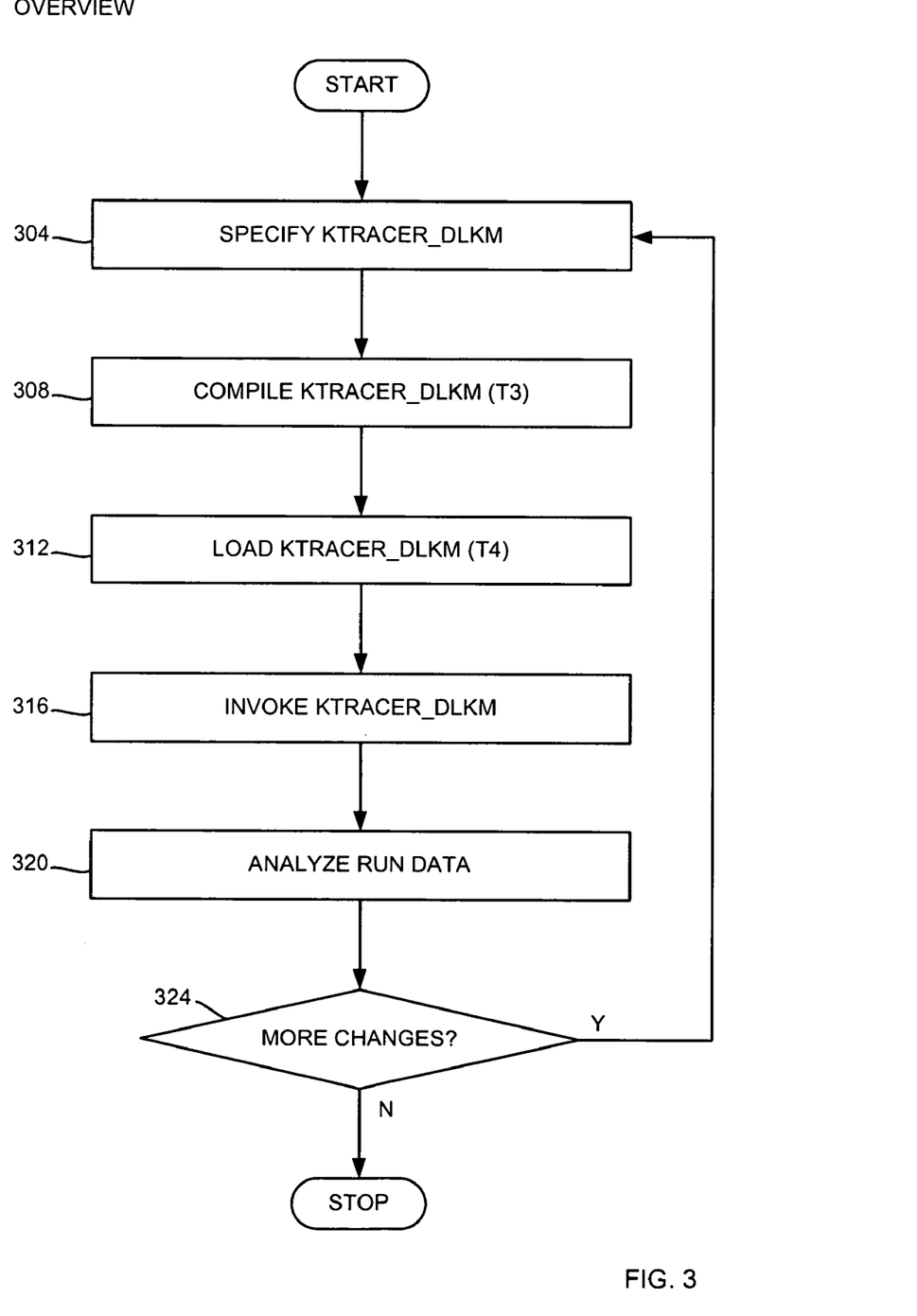
FIG. 3 is a diagrammatic flowchart illustrating an overview of embodiments of the present invention.

Referring to FIG. 3, FIG. 3 is a diagrammatic flowchart illustrating an overview of embodiments of the present invention. At a first step 304, a KTRACER_DLKM may be specified. One may appreciate that the naming conventions used herein is for clarity only and not intended to be limiting in any way. Specifying a KTRACER_DLKM is discussed in further detail below for FIG. 4. Once a KTRACER_DLKM is specified, it may be compiled at a step 308. Time representing a compile step is indicated as T3. In some embodiments, a compiling step may be less than a few seconds. In other embodiments, a compiling step may be less than a few minutes. In still other embodiments, a compiling step may be approximately a few minutes. Once a DLKM is built, a KTRACER_DLKM may be loaded onto a target machine at a step 312. Time representing a compile step is indicated as T4. In some embodiments, a loading step may take less than a few seconds. Once a KTRACER_DLKM is loaded, a KTRACER_DLKM may be invoked at a step 316. In some embodiments invoking a KTRACER_DLKM may include gathering trace values that are user-specified variables, and executing user-specified kernel code. In some embodiments, invoking a KTRACER_DLKM does not require a kernel recompile. As noted above, a recompile step for a kernel may last from 4 to 8 hours. Thus, a significant time savings may be achieved in some embodiments. In other embodiments, invoking a KTRACER_DLKM does not require a reboot. As noted above, a reboot of a system might require 10 minutes to 5 hours. Thus, additional time savings may be achieved in some embodiments.

Run data may be analyzed at a step 320. Run data may include trace values gathered by a specified KTRACER_DLKM. Run data will be discussed in further detail below for FIG. 5. The method then determines whether more changes are desired at a step 324. That is, based on run data analysis, the method determines whether additional programmatic changes are necessary to meet user or system requirements. If the method determines that additional changes are needed, then the method returns to a step 304 and may iterate until all changes are completed in accordance with user preferences. When no more changes are desired, the method ends. As one can appreciate, significant time efficiencies may be achieved when making kernel modifications over conventional methods as described above.

Figure 4:
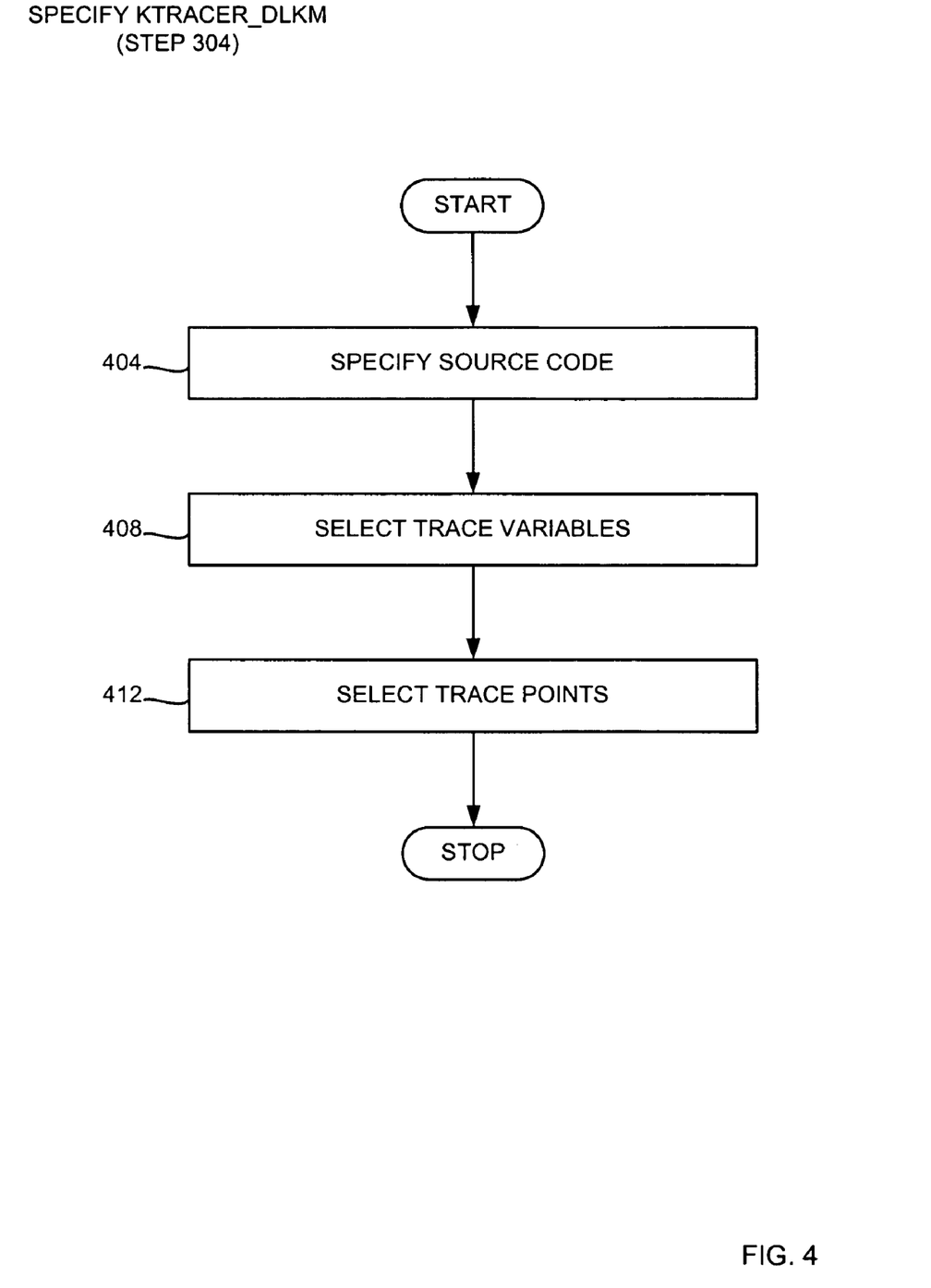
FIG. 4 is a diagrammatic flowchart illustrating specifying a KTRACER_DLKM in an embodiment of the present invention.

Referring to FIG. 4, FIG. 4 is a diagrammatic flowchart illustrating specifying a KTRACER_DLKM 304 in an embodiment of the present invention. At a first step 404, kernel source code may be specified. That is, original kernel source code may be developed or existing kernel source code may be modified. Kernel source code may include any user-specified code. For example, in one embodiment, a runtime assertion may be made. A runtime assertion may represent a programmatic assertion, which, when met, may initiate an action. For example, a runtime assertion may take the form of:

$$\text{If spinlock\_depth=negative, call panic} \tag{eqn. 1}$$

In this example, when the parameter spinlock_depth is equivalent to negative (i.e. the runtime assertion is fulfilled), then function panic is called. Any number of runtime assertions may be made. In other embodiments, a function call may be made. As noted in eqn. 1, a function call is made when a runtime assertion is fulfilled. In that example, function panic is called. Any number of functions may be called in accordance with user preferences. In some examples it may be useful to test a function using the KTRACER_DLKM prior to inserting the function into kernel source code by nesting the function within the KTRACER_DLKM. For example, a kernel function foo may be coded into a KTRACER_DLKM where the call is made. In this manner, kernel recompiling and system rebooting may be avoided when testing kernel code.

In other embodiments, an increment counter may be implemented as user-specified code. For example:

$$\text{If timer}=100 \text{ ms, then counter}=\text{counter}+1 \quad \text{(eqn. 2)}$$

In this example a counter is incremented after each interval of 100 milliseconds. Increments may be made in any manner well-known in the art without limitation. In still other examples, kernel state may be modified. For example, a kernel state may be modified to stop when a condition or set of conditions occur. This might be useful in isolating a process after a condition such as a function call occurs. In other examples, the KTRACER_DLKM function may instruct tracing to stop after a condition or set of conditions occur. Triggering in this manner may be made without limitation.

When source code is being specified, trace variables may be selected at a step 408. Trace variables are those variables relating to processes of interest and may be selected in accordance with user preference. Those skilled in the art can appreciate how selection of variables may be useful in debugging a particular piece of code. In some embodiments, trace variables may be selected from the group consisting of fixed fields, global variables, function return values, function output arguments, macros, constants, register values, or variables local to a KTRACER_DLKM function in accordance with user preferences. In some embodiments four trace variables may be selected. In other embodiments, more or less than four trace variables may be selected. Trace variables comprise a subset of trace values available to a KTRACER_DLKM. Another trace value subset is a fixed field. In some embodiments, there are less than 23 fixed fields. In other embodiments, there are approximately 23 fixed fields. In still other embodiments, there are more than 23 fixed fields. Fixed fields are those fields automatically gathered by embedded kernel tracing functions. These fixed fields may be useful in debugging kernel processes and need not be selected with trace variables.

After trace variables are selected, trace points may be specified at a step 412. A trace point represents, in some embodiments, a point at which a KTRACER_DLKM is run and thus, when trace values are collected. For example, a trace point may be configured at an entry to a function foo. Thus, each time kernel enters a function foo, a KTRACER_DLKM may be called which collects all trace values (i.e. trace variables, fixed fields, etc). In some examples, as many as tens of thousands of trace points may be configured. At each of any number of trace points, a user may execute user-specified kernel code without reboot. Thus, significant efficiencies may be achieved. In other examples, a trace point may be configured at an exit of a function. Thus, each time kernel exits, for example, a function foo, a KTRACER_DLKM is run which collects all trace values. Trace points are generally configured with a kernel tracing tool outside of a KTRACER_DLKM.

Furthermore, user-specified kernel code may contain conditional statements. For example: if kernel is in a process context; collect process-related trace variables; else do not.

Thus, in this example, when a kernel is processing, user-specified kernel code may execute to collect process related trace variables. Otherwise, those related variables may not be collected. As another example: if handing an interrupt of a certain type; increment a counter. Thus, in this example, if an interrupt of a particular type is being handled, a counter will be incremented. Otherwise a counter may not be incremented.

Figure 5:
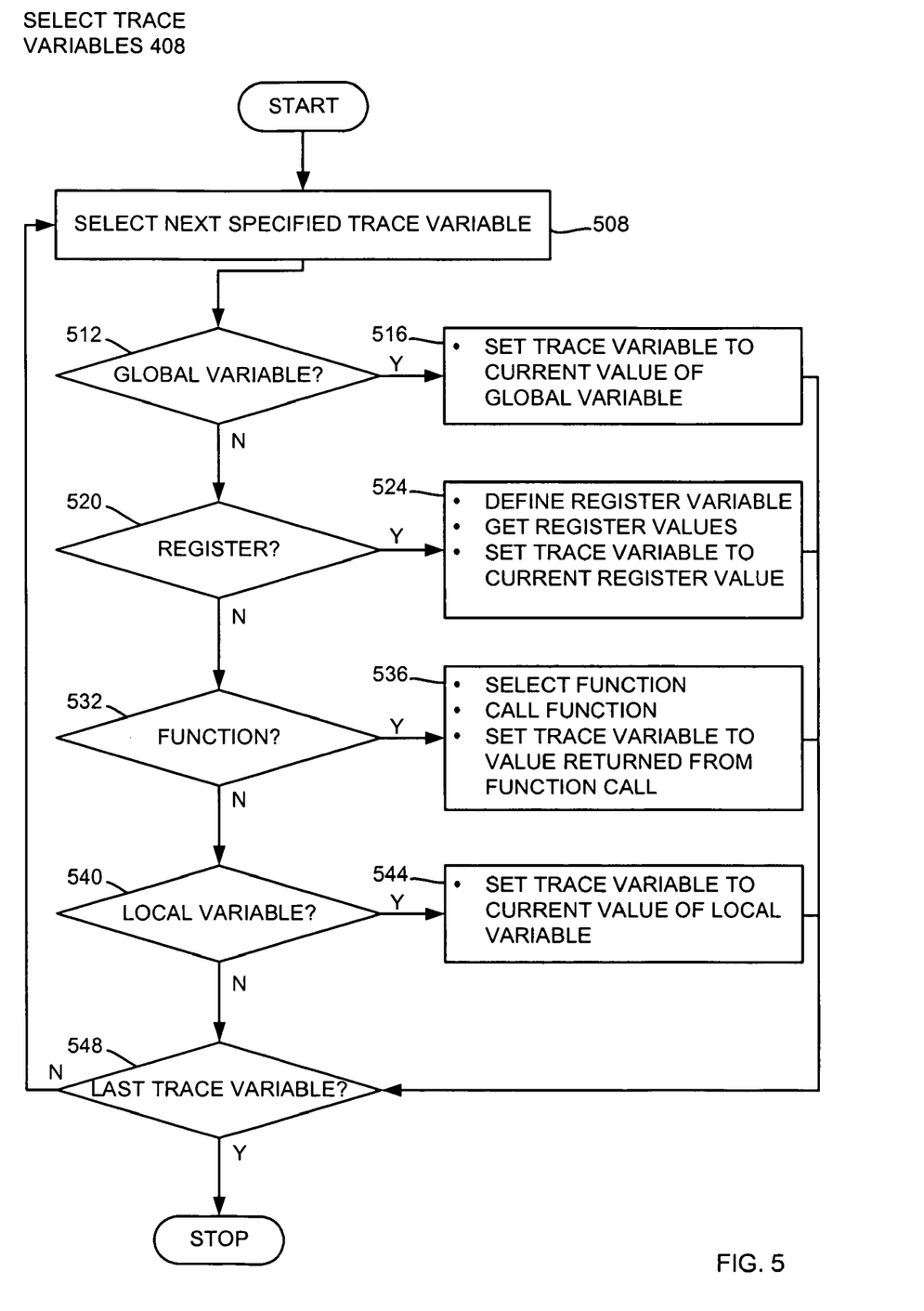
FIG. 5 is a diagrammatic flowchart illustrating selecting trace variables in an embodiment of the present invention.

FIG. 5 is a diagrammatic flowchart illustrating selecting trace variables 408 in an embodiment of the present invention. At a first step 508, a specified trace variable is selected. The method then queries whether selected trace variable is a global variable at a step 512. If the method determines that selected trace variable is a global variable, then the method sets selected trace variable to a current value of a global variable at a step 516. Thus, if a global value has been selected as a trace value as, for example, in a step 408 (see FIG. 4), then at a step 516, a global value returned by a kernel being inspected by KTRACER_DLKM may be stored to selected trace variable. The method then continues to determine whether the last trace variable has been selected at a step 548.

If the method determines at a step 512 that selected trace variable is not a global variable, the method then queries whether selected trace variable is a register variable at a step 520. If the method determines that selected trace variable is a register variable then the method defines a register variable, gets register values, and then sets selected trace variable to current register value at a step 524. Thus, if a register variable has been selected as a trace value as, for example, in a step 408 (see FIG. 4), then at a step 524, a register value returned by a kernel being inspected by KTRACER_DLKM may be stored to selected trace variable. The method then continues to determine whether the last trace variable has been selected at a step 548.

If the method determines at a step 520 that selected trace variable is not a register variable, the method then queries whether selected trace variable is a function at a step 532. If the method determines that selected trace variable is a function then the method selects the function, calls the function, and then sets selected trace variable to a value returned by the function at a step 536. In some embodiments, a function argument may be returned. In those embodiments the method sets selected trace variable to an argument returned by a function at a step 536. Thus, if a function has been selected as a trace value as, for example, in a step 408 (see FIG. 4), then at a step 536, a value returned by a kernel being inspected by KTRACER_DLKM may be stored to selected trace variable. The method then continues to determine whether the last trace variable has been selected at a step 548.

If the method determines at a step 532 that selected trace variable is not a function, the method then queries whether selected trace variable is a local variable at a step 540. If the method determines that selected trace variable is a local variable then the method sets selected trace variable to a current local variable value at a step 544. Thus, if a local variable has been selected as a trace value as, for example, in a step 408 (see FIG. 4), then at a step 544, a local variable value returned by a kernel being inspected by KTRACER_DLKM may be stored to selected trace variable. The method then continues to determine whether the last trace variable has been selected at a step 548.

If the method determines that the last trace variable has not been selected (i.e. there are more trace variables) at a step 548 then the method returns to a step 508 to select next specified trace variable. If the method determines that the last trace variable has been selected at a step 548 then the ends. If the method determines that the last trace variable has not been selected at a step 548, the method returns to a step 508 to select a next specified trace variable.

While this invention has been described in terms of several embodiments, there are alterations, permutations, and equivalents, which fall within the scope of this invention. It should also be noted that there are many alternative ways of implementing the methods and apparatuses of the present invention. For example, as illustrated in FIG. 5, steps 512, 520, 532, and 540 for determining type of trace variable may be accomplished in any order in accordance with user preferences. It is therefore intended that the following appended claims be interpreted as including all such alterations, permutations, and equivalents as fall within the true spirit and scope of the present invention.

What is claimed is:

1. A method of tracing a kernel function of a kernel comprising:
    providing, on a target machine, a kernel tracing dynamically loadable kernel module (DLKM), wherein the kernel tracing DLKM contains kernel code to provide a kernel activity of the kernel, wherein the kernel activity is to be tested prior to inserting the kernel code for the kernel activity into source code of the kernel;
    invoking, in response to a point reached during execution of the kernel, the kernel tracing DLKM on the target machine, wherein invoking the kernel tracing DLKM causes execution of the kernel code to be tested without first inserting the kernel code into the source code of the kernel; and
    collecting, by the invoked kernel tracing DLKM, trace variables.

2. The method of claim 1 further comprising:
    creating the kernel code to test the kernel activity;
    inserting the kernel code into the kernel tracing DLKM;
    creating at least one trace point in the kernel corresponding to the point at which the kernel tracing DLKM is invoked; and
    compiling the kernel tracing DLKM.

3. The method of claim 2 further comprising defining the trace variables wherein the trace variables relate to the kernel activity.

4. The method of claim 2 wherein the kernel code is selected from the group consisting of: a runtime assertion, a function call, a function, an increment counter, and a kernel state modification.

5. The method of claim 3 wherein the trace variables are user-specified variables.

6. The method of claim 1 wherein the kernel is an HP-UX kernel.

7. The method of claim 1, wherein testing the kernel activity by invoking the kernel tracing DLKM prior to inserting the kernel code into the source code of the kernel allows the kernel activity of the kernel to be tested without having to first recompile the source code of the kernel.

8. The method of claim 1, wherein testing the kernel activity by invoking the kernel tracing DLKM prior to inserting the kernel code into the source code of the kernel allows the kernel activity of the kernel to be tested without having to first reboot the target machine.

9. The method of claim 1, further comprising:
    according to the testing of the kernel code based on invoking the kernel tracing DLKM, modifying the source code of the kernel with the kernel code to provide the kernel activity.

10. A computer-readable storage medium containing instructions that are executable by a computer system to:
    define at least one trace point corresponding to a point at which a kernel tracing dynamically loadable kernel module (DLKM) is invoked to cause the kernel tracing DLKM to collect trace values associated with operation of a kernel, wherein the kernel tracing DLKM includes kernel code for a kernel activity of the kernel, wherein the kernel activity is to be tested prior to inserting the kernel code into source code of the kernel; and
    invoke the kernel tracing DLKM at the trace point to collect the trace values, wherein invoking the kernel tracing DLKM causes execution of the kernel code to be tested without first inserting the kernel code into the source code of the kernel.

11. The computer-readable storage medium of claim 10, wherein the kernel tracing DLKM further comprises a trace variable wherein the trace variable relates to the kernel activity.

12. The computer-readable storage medium of claim 10 wherein the kernel code is selected from the group consisting of: a runtime assertion, a function call, a function, an increment counter, and a kernel state modification.

13. The computer-readable storage medium of claim 11 wherein the trace variable is a user-specified variable.

14. The computer-readable storage medium of claim 10, wherein testing the kernel activity by invoking the kernel tracing DLKM prior to inserting the kernel code into the source code of the kernel allows the kernel activity of the kernel to be tested without having to first recompile the source code of the kernel.

15. The computer-readable storage medium of claim 10, wherein testing the kernel activity by invoking the kernel tracing DLKM prior to inserting the kernel code into the source code of the kernel allows the kernel activity of the kernel to be tested without having to first reboot the target machine.

16. A computer program product for use in conjunction with a computer system for tracing kernel functions of a kernel, the computer program product comprising computer readable storage medium and a computer program embedded therein, the computer program executable in the computer system to:
    load a kernel tracing dynamically loadable kernel module (DLKM), wherein the kernel tracing DLKM contains kernel code to be tested prior to insertion of the kernel code into source code of a kernel;
    in response to a point reached during execution of the kernel, invoke the kernel tracing DLKM to execute the kernel code to be tested; and
    trace, by the kernel tracing DLKM, functions of the executed kernel code, wherein the tracing comprises gathering trace variables.

17. The computer program product of claim 16 wherein the computer program product is executable in the computer system to further;
    create at least one trace point corresponding to the point at which the kernel tracing DLKM is invoked; and
    compile the kernel tracing DLKM.

18. The computer program product of claim 16 wherein the computer program is executable to further define trace variables wherein the trace variables relate to a kernel activity provided by the kernel code to be tested.

19. The computer program product of claim 16 wherein the kernel code is selected from the group consisting of: a runtime assertion, a function call, a function, an increment counter, and a kernel state modification.

20. The computer program product of claim 18 wherein the trace variables are user-specified variables.

21. The computer program product of claim 16, wherein testing the kernel code by invoking the kernel tracing DLKM prior to inserting the kernel code into the source code of the kernel allows the kernel code to be tested without having to first recompile the source code of the kernel.

22. The computer program product of claim 16, wherein testing the kernel code by invoking the kernel tracing DLKM prior to inserting the kernel code into the source code of the kernel allows the kernel code to be tested without having to first reboot the target machine.

23. A method of building a kernel tracing dynamically loadable kernel module (DLKM) comprising:
   creating, in a computer system, kernel code to provide or test at least one kernel activity of a kernel, wherein the kernel code is part of the kernel tracing KLKM, and wherein the kernel activity is to be tested prior to inserting the kernel code into source code of the kernel;
   creating, in the computer system, at least one trace point corresponding to a point at which the kernel tracing DLKM is invoked to collect trace values associated with operation of the kernel, wherein invoking the kernel tracing DLKM is to cause execution of the kernel code without first inserting the kernel code into the source code of the kernel; and
   compiling, in the computer system, the kernel tracing DLKM.

24. The method of claim 23 further comprising defining a trace variable wherein the trace variable relates to the at least one kernel activity.

25. The method of claim 23 wherein the kernel code is selected from the group consisting of: a runtime assertion, a function call, a function, an increment counter, and a kernel state modification.

26. A method of debugging a kernel comprising:
   providing, in a target machine, a debugging dynamically loadable kernel module (DLKM), wherein the debugging DLKM contains kernel code to provide a kernel activity of the kernel, wherein the kernel activity is to be tested prior to inserting the kernel code for the kernel activity into source code of the kernel;
   invoking, in response to a point reached during execution of the kernel, the debugging DLKM on the target machine, wherein invoking the debugging DLKM causes execution of the kernel code to be tested without first inserting the kernel code into the source code of the kernel; and
   collecting, by the invoked debugging DLKM, a debugging value.

* * * * *